United States Patent [19]
Morgan

[11] 4,072,340
[45] Feb. 7, 1978

[54] WINDOW ASSEMBLY

[75] Inventor: Cleon C. Morgan, Holland, Mich.

[73] Assignee: Donnelly Mirrors, Inc., Holland, Mich.

[21] Appl. No.: 724,618

[22] Filed: Sept. 20, 1976

[51] Int. Cl.² ............................................. B60J 1/00
[52] U.S. Cl. ................................... 296/84 R; 52/208; 160/371
[58] Field of Search ............ 296/84 R, 84 D; 52/208, 52/400; 264/263, 273, 274; 160/371; 20/56.4, 56.5; 29/428

[56] References Cited
U.S. PATENT DOCUMENTS

| | | | |
|---|---|---|---|
| 1,614,151 | 1/1927 | Schmidt | 296/84 D |
| 1,911,578 | 5/1933 | Masters | 296/84 R |
| 2,025,198 | 12/1935 | Conrow | 20/56.5 |
| 2,258,724 | 10/1941 | Wagner et al. | 20/40 |
| 2,266,235 | 12/1941 | Mollard | 20/56.5 |
| 2,342,758 | 2/1944 | Saunders et al. | 296/84 R |
| 2,576,392 | 11/1951 | Downes | 52/208 |
| 2,645,827 | 7/1953 | Koll | 20/56.4 |
| 2,701,041 | 1/1955 | Toth | 52/208 |
| 2,966,435 | 12/1960 | Kassinger | 154/2.71 |
| 2,974,407 | 3/1961 | Barr | 29/428 |
| 3,719,222 | 3/1973 | Harding et al. | 160/371 |
| 3,744,201 | 7/1973 | Dochnahl | 52/400 |
| 3,776,591 | 12/1973 | Krueger | 296/146 R |
| 3,851,432 | 12/1974 | Griffin | 52/400 |
| 3,884,007 | 5/1975 | Thoman | 52/624 |
| 4,007,536 | 2/1977 | Soderberg et al. | 29/421 |

Primary Examiner—Richard A. Bertsch
Attorney, Agent, or Firm—Price, Heneveld, Huizenga & Cooper

[57] ABSTRACT

A vehicular window assembly formed as a complete unit prior to installation and adapted to be installed as a unit from the exterior of the vehicle body with only final securement of attaching means being necessary from the interior of the vehicle body. The assembly includes a molded plastic casing or gasket, a transparent window covering an aperture in the casing and an attachment member for attaching the casing to the body having a portion molded or embedded within the casing. The attaching portion preferably includes a frame bezel and retaining projections extending into the casing or gasket on one side of the frame. Together with the resilient gasket or casing, the projections accommodate any deviations in contour or curvature between the frame and window. The gasket or casing is preferably injection molded polyvinyl chloride.

24 Claims, 7 Drawing Figures

WINDOW ASSEMBLY

BACKGROUND OF THE INVENTION

This invention relates to window assemblies and, more particularly, to a window assembly including a frame, a window, and a gasket or casing for holding the frame and window together. The window assembly is especially useful in vehicles and is installed from the exterior of the vehicle as a complete unit.

The installation of windows, especially in vehicles, has taken many forms. A common example is the positioning of a window pane or sheet of glass against a bead of sealant applied around the periphery of an aperture in a window frame and thereafter framing in or securing the rear side of the glass to the frame. This is typically done in building structures or in window units for such structures. In window assemblies for vehicles, however, and especially those windows which are not designed to be raised and lowered but rather are permanently positioned such as in the rear quarter panel of an automobile, installation of such permanent windows has often been time consuming, complicated and thus quite expensive.

In one method, a bead of sealant was applied to the periphery of the window frame from the interior of the auto with a sheet of glass pressed against that sealant, a back-up frame applied around the rear of the glass and sealant and a plurality of clips or other securing fasteners applied to hold the back-up frame in position. Either before or after all of the above, a finished metallic or other frame had to be applied from the exterior of the car to hide the raw, unfinished edges around the window aperture. Such piecemeal assembly steps have also been used in other permanently mounted vehicle windows such as the windshield or rear window except that the installation occurs from the exterior in the above-mentioned piecemeal fashion.

Another method for attaching permanent windows in automobiles and other vehicles was the prior securement of a window pane or sheet of glass to a metallic frame by means of a rubber or other similar collar which extends over both sides of the edge of the window aperture in the metal frame and also extends around the periphery of the glass to hold the frame and glass together. This frame and glass was then applied from the interior of the automobile to an aperture in the vehicular body while being secured and sealed in place. Again, however, a finishing bezel or frame had to be applied from the exterior of the body to conceal from the exterior the material holding the interior frame and window together. This method could thus not be used to secure a window directly from a vehicle exterior because the extension of the rubber or other collar over both sides of the window frame left an unsightly external ridge necessitating cover up with additional material.

None of the above methods, therefore, provided a simple, easily installed, completely finished window assembly which could be located virtually entirely from the exterior of the vehicle in order to save time and expense.

Another problem in the installation of windows especially in modern vehicles is the difference in curvature between the window itself and the frame to which it is to be secured. Since the glass in many current automobiles is typically curved or bent and tempered, and such bending is usually less precise than the stamping or bending of the frame to which it is to be secured to attached, differences in curvatures often exist. Any attachment of a window to a frame to provide a window assembly ready for installation would have to overcome and accommodate the problem of such differing curvatures as well as the stress resulting from the window tending to return to its own shape or curvature should the window be secured in the shape or curvature of the frame.

SUMMARY OF THE INVENTION

Accordingly, the present invention provides a finished, completed window assembly which is ready for installation virtually entirely from the exterior of a vehicle or other supporting body in a manner which has heretofore been unknown. The window assembly combines a frame, typically of metal or plastic which is preshaped and finished to be ready for application to the exterior of a vehicle or other support, a transparent window, typically a curved or planar glass sheet, and a flexible, resilient gasket or casing which holds the window to the preformed frame. The assembly includes apparatus for attaching the unit in its entirety from the exterior of the auto or one side of a support in its permanently located position. The attaching apparatus is concealed from view after attachment and only final securement of this apparatus is necessary from the interior of the vehicle or the opposite side of a support. The invention, therefore, eliminates the need of piecemeal assembly of the various window unit elements from either the interior or exterior of the vehicle.

In one form, the window assembly comprises a casing constructed of a molded plastic material approximating the shape and size of an opening in a vehicle body. The casing is molded around the peripheral edge of a transparent window. The casing is also molded around at least a first portion of an attachment means for attaching the casing to the vehicle body. The first portion is embedded within the casing while the casing includes an inner surface arranged to face in a direction toward the inside of the vehicle body and an outer surface arranged to face in a direction toward the outside of the vehicle body. The attachment means has second portions spaced along the casing, extending in a direction toward the inside of the vehicle body, and constituting affixing means for fixing the composite casing and transparent window over the opening in the vehicle body. The casing and attachment structure provide a finished trim around the window and the periphery of the opening in the vehicle body while the second, affixing portions of the attachment means are concealed from view outside the vehicle body.

The window assembly of the present invention also overcomes the above-described problem of differences in curvature between the curved glass or window and frame. Retaining projection means are included on the window frame extending at least partially into the gasket or casing from one side of the frame for holding the gasket and window to the frame. These retaining projection means interact with the flexible, resilient gasket to accommodate any deviations in contour or curvature which cause stress between the frame and window without allowing the window to pull away from the frame. In the preferred embodiment, the retaining means are projections which extend into the gasket which is injection molded from polyvinyl chloride around the periphery of the window, in a space intermediate the window and the edge of the window aperture in the frame, and around the projections. The projections also include apertures or other surface irregularities which are filled in by the molded material. After molding, when the window tends to return to its original and often differing curvature from the frame, the resiliency of the gasket material and its secure retention to the projections, allows the gasket to yield but prevents separation of the window and frame.

The invention also provides secure sealing between the gasket and the frame as well as between the frame and its ultimate support such as a vehicle body. The concealed attaching structure for securing the assembly to the support or vehicle body preferably extends to the same side of the frame as do the retaining projections for the gasket and window.

These and other objects, advantages, purposes and features of the invention will become more apparent from a study of the following description taken in conjunction with the drawings.

DESCRIPTION OF THE PREFERRED EMBODIMENT

Figure 1:
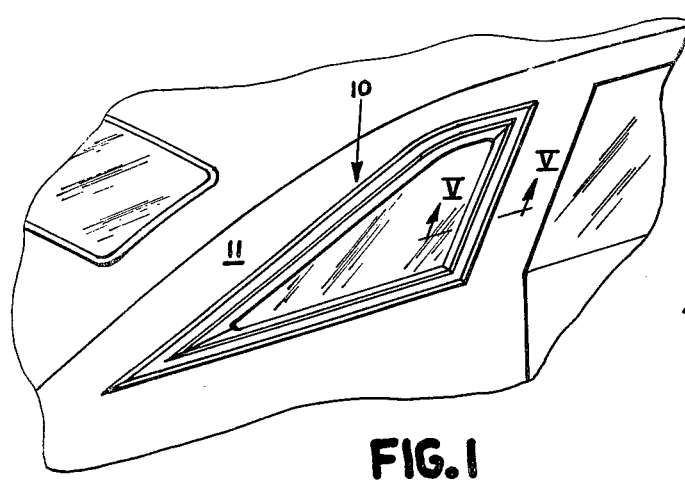
FIG. 1 is a fragmentary, perspective view of the rear quarter of an automobile illustrating the window assembly of the present invention secured thereon.

Referring now to the drawings in greater detail, FIG. 1 illustrates the window assembly 10 of the present invention secured to the rear, roof support post portion 11 of an automobile above the rear quarter panel area. The window unit assembly 10 is designed for permanent installation to provide a window which cannot be raised or lowered. As mentioned above, the assembly provides an improvement over the prior known piecemeal assembly methods used for installation of permanently positioned windows in vehicles and other structures and allows installation of the window assembly as a unit from the exterior of the automobile with only final securement of a few nuts or other securing means being necessary from the interior to complete the installation.

Figure 5:
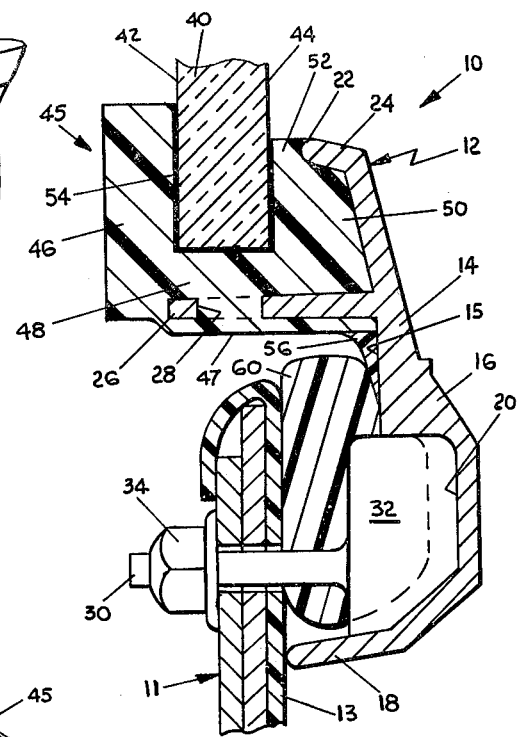
FIG. 5 is a sectional view taken along line V—V of FIG. 1 showing the arrangement of the frame, window element and gasket as well as the attachment and sealing of the window unit to the vehicle body.

As shown in FIGS. 2-5, the window assembly 10 includes a window attachment frame bezel 12 having a peripheral outline or configuration designed to match the contour of the ultimate support or vehicle body to which it will be attached. As shown in FIG. 5, frame 12 includes a generally rectilinear or straight central section 14 which protrudes outwardly as well as a channellike section 16 toward the outer periphery of the frame. Channel portion 16 extends laterally inwardly and ends in a lower lip 18 which contacts the vehicle body or support at the outermost periphery of the frame. Channel 16 also forms an interior chamber or channel area 20 which receives a sealing bead 60 as will be explained more fully hereinafter. The inner periphery of the frame which defines the window aperture 22 ends in a laterally inwardly extending lip 24. Lip 24 extends laterally toward the side of the frame 12 on which the window glass 40 and retaining gasket 45 are secured. At spaced intervals around the entire continuous frame 12, on the laterally inner side of the frame to which the glass window is secured, are integrally formed in one piece with the frame a plurality of tabs or retaining projections 26 which cooperate with the resilient, flexible gasket material as will be explained more fully hereinafter. Each tab or retaining projection 26 is generally square or rectangular and extends generally perpendicularly to the general plane of the entire frame and generally parallel to the peripheral edge of window 40. Each projection includes a circular aperture 28 extending completely therethrough forming an irregular surface extending transversely of the projection and the side surfaces of the window. Apertures 28 are filled during the assembly of the window unit by the moldable gasket material so as to retain the gasket to the frame.

Also included on the frame 12 are a plurality of cylindrical securing studs 30 extending generally perpendicularly or normal to the general plane of the frame toward the inner side of the frame to which the glass is secured as do tabs or projections 26. Studs 30 are formed integrally in one piece with platform areas 32 which in turn are formed integrally in one piece with the frame in the channel area 20 at spaced intervals on the interior side of channel portion 16. Studs 30 receive stamped sheet metal jamb or grip nuts 34 on the inside of a support such as a vehicle body 11 as shown in FIGS. 1 and 5 to secure the entire assembly 10 to the vehicle.

The second major portion of the assembly is the sheet or pane of transparent window glass 40 which is retained to the inner side of the frame 12 by a tough, flexible, resilient gasket 45 which extends continuously about the entire inner periphery of frame 12 and is preferably formed from molded polyvinyl chloride. Window 40 is typically a sheet of tempered glass curved to the contour of frame 12 (FIG. 4) although other transparent sheet materials such as plastic could be used.

Gasket or molded casing 45 forms a tough yet yieldable adhering member between the frame and glass. The gasket or casing is injection molded around the entire peripheral edge of the window 40 as well as each of the projections 26 such that the gasket material flows through, entirely fills, and tightly engages both the projection and the apertures 28 therein. As shown in FIG. 5, the gasket 45 includes a ridge or shoulder 46 abutting and extending inwardly of the window periphery along rear surface 42 of the window opposite the side on which frame 12 is located, a base area 48 which extends generally parallel to the peripheral edge surface of the window 40 and encompasses the projections 26, and a frame portion 50 extending between the front surface 44 of window 40 and frame 12 including central portion 14 and inner lip 24. Frame portion 50 ends in a reduced thickness gasket portion 52 which extends between the end of inner lip 24 and glass surface 44 and forms a flush, continuous surface with the outer surface of the lip 24. During assembly, frame 12 and glass 40 are held and positioned within a mold while the moldable material from which gasket 45 is made, preferably polyvinyl chloride, is flowed into the mold around the peripheral edge of the glass 40 and inside frame 12 on one side thereof as shown in FIG. 5 as well as around and through projections 26. Projections 26 are covered by the gasket and preferably do not extend therefrom. As the polyvinyl chloride or other moldable material cools, hardens and sets up, it becomes a tough, resilient, flexible and yieldable mass extending continuously around the inside of the frame for holding the glass in position as shown in the figures. Any need for additional securing members such as screws, rivets or the like to hold the window, gasket or casing and frame together is eliminated.

Figures 2, 3, 4:
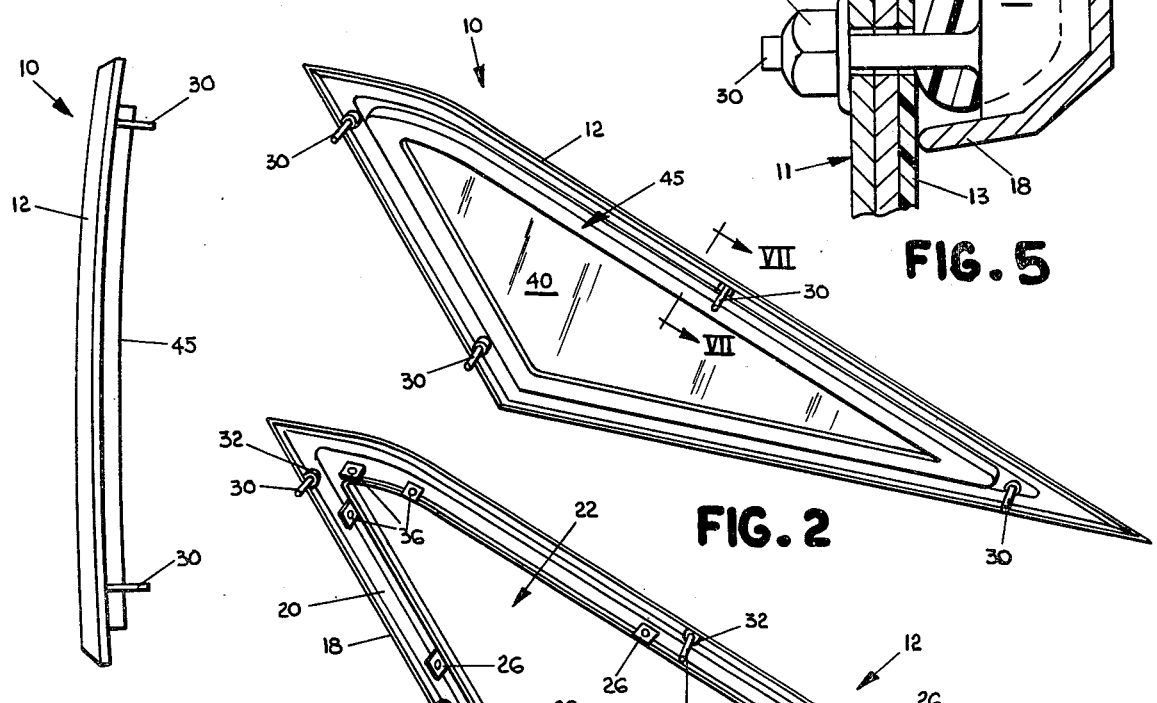
FIG. 2 is a perspective view of the back or inner side of the window assembly of the present invention, the back side being concealed from view after installation.
FIG. 3 is a perspective view of the back or inner side of the window frame portion of the window assembly.
FIG. 4 is an end view of the window assembly shown in FIGS. 1 and 2.
Figure 7:
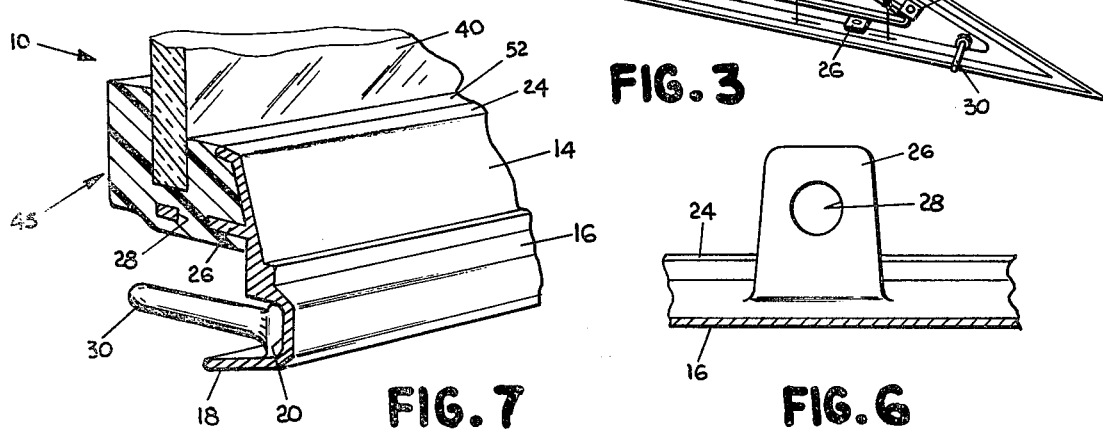
FIG. 7 is a fragmentary, perspective view taken along line VII—VII of FIG. 2 and shown partially in cross section of a portion of the window assembly showing the attachment of the window to the frame by means of the gasket and retaining structure.
Figure 6:
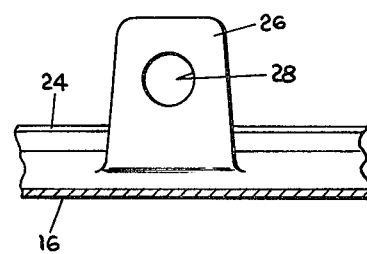
FIG. 6 is a fragmentary, side elevation shown partially in cross section of one of the retaining projections formed on the window frame and taken along line VI—VI of FIG. 3.

As shown in FIG. 4, window assemblies 10 typically include some curvature in accordance with the design of modern automobiles. Glass 40 is typically a cylindrically bent, tempered glass sheet contoured to the shape of the curved frame bezel 12. Often, however, a small variation tolerance occurs between the curvature or contour of the frame bezel and glass because the tempered, cylindrically pressed glass cannot be bent to an exact curvature as can the frame bezel which is typically made from plastic or metal. Accordingly, even though the glass is forced into the contour or shape of the bezel by the mold during the process of flowing the moldable material around the two parts to form gasket 45, glass 40 will return to its original bent shape varying from the curvature of the frame bezel after the mold pressure is released and the gasket has set up and become tough, flexible and resilient. However, the combination of the retaining projections 26 including apertures 28 and the resiliency and yieldability of the gasket material combines to accommodate any stress placed on the gasket by the glass returning to its original configuration. Except for large or gross differences in curvature, gasket 45 is prevented from pulling away from the frame bezel by projections 26 with apertures 28 filled by the gasket material and proper retention and sealing between the glass and frame bezel is maintained.

In order to ensure proper retention of the glass 40 in the gasket 45, the peripheral edge and surfaces 42, 44 of glass 40 adjacent that edge are coated prior to molding of the gasket therearound with a primer layer or coating 54 of a heat activatable, resinous material which promotes and facilitates the adhesion of the gasket material to the glass 40. A preferred primer material is a combination material obtained from the B. F. Goodrich Chemical Company under Product Nos. A-1100-B and A-1167-B. The primer includes 98% of composition A-1100-B and 2% of composition A-1167-B. The primer layer 54 ensures proper bonding and adhesion of the gasket to the glass 40.

To assure the proper weatherproofing and sealing of the joint between the frame 12 and gasket 45 along the inner surface of central portion 14, an additional bead of sealant material 56 is located and secured in the corner between the outer peripheral surface 47 of gasket 45 and the inner surface 15 of central portion 14 of frame 12. This sealing bead 56 which is curved across the corner continuously around the entire frame-gasket combination is preferably formed from a pumpable, flowable, self-adherant, tacky, sealer composition such as that made by the 3M Company, Inc. under Product No. EC 1792. Sealing bead 56 prevents leakage of water, dust, or other contaminants between gasket 45 and the inner surface of frame 12 even when glass 40 returns to a contour which may vary from that of the frame and which may cause gasket 45 to yield somewhat to the stress imposed by such variance. Sealant 56 remains flexible and self-adherant throughout its life so as to retain its sealing qualities.

When completed as shown in FIGS. 2, 4, 5 and 7, window assembly 10 is ready for installation on its support such as a vehicle body or roof support post 11. The assembly is installed directly from the exterior of the body since the frame 12 itself is finished prior to assembly with the glass and gasket such as by chrome plating, painting, a combination of the two or the like. To install the finished unit, a large bead 60 of butyl sealer of the type produced by Tremco, Inc. under Product No. 75268A is applied along the interior surface of channel 16 in area 20 of frame 12 around the entire frame. This sealer remains tacky and pliable throughout its life to maintain its sealing properties. If desired, sealant bead 60 could be applied to frame 12 immediately after manufacture of assembly 10. Assembly 10, with the butyl sealer thereon, is pushed against the body with its inner or glass side facing the body or support such that studs 30 extend into holes or apertures previously provided in corresponding places in the body. The sealer 60 conforms to the shape of the channel portion 20 and firmly adheres to the body 11 which may include a sheet of vinyl roof covering material 13 between the window unit and the body of sheet metal. Thereafter, all that remains to be done is the application of a jamb or grip nut 34 on each stud 30 against the inside surface of the body 11 so that the entire frame is pulled tightly against the outer surface of body 11 with outer peripheral lip 18 being in tight contact therewith. No additional external molding, sealing or finishing strips or elements need be applied to the window since the assembly is complete from the exterior after the above installation. The installation process is, therefore, virtually entirely performed from the exterior of the car, saving time and expense in the assembly operation. Proper sealing is obtained with the gasket 45 and butyl sealant beads 56 and 60 entrapped between the body and frame 12 and concealed from view thereby. In addition, securing studs 30 are also concealed from view behind the exterior surface of the frame. The entire unit provides a neat, finished, high quality appearance from the exterior of the vehicle after installation. The troublesome and time-consuming piecemeal assembly operations previously used to install permanent windows of this type are, therefore, completely eliminated.

Alternately, other forms of attachment or securing means may be substituted for studs 30. Such means might include bendable clips secured to the inner surface of the frame and bent over the edge of the body portion 11 or the like. However, even in this case, they will remain concealed from the exterior of the unit when installed.

While several forms of the invention have been shown and described, other forms will now be apparent to those skilled in the art. Therefore, it will be understood that the embodiments shown in the drawings and described above are merely for illustrative purposes and are not intended to limit the scope of the invention which is defined by the claims which follow.

The embodiments of the invention in which an exclusive property or privilege is claimed are defined as follows.

1. A vehicular window assembly formed as a complete unit prior to installation and adapted for installation from the exterior of a vehicle body to provide an assembly for closing an opening in a vehicle body, said window assembly comprising a casing constructed of a molded plastic material approximating the shape and size of the opening in said vehicle; a transparent window having a peripheral edge with said casing molded around said peripheral edge; attachment means for attaching said casing to said vehicle body, said casing being molded around at least a first portion of said attachment means so as to embed said first portion within the casing; said casing having an inner surface arranged to face in a direction toward the inside of the vehicle body and an outer surface arranged to face in a direction toward the outside of said vehicle body; said attachment means having second portions spaced along the casing, extending in a direction toward the inside of said vehicle body, and constituting affixing means for affixing said composite casing and transparent window over said opening in the vehicle body; said casing and attachment means structure providing a finished trim around said window and the periphery of the opening in the vehicle body by which said second, affixing portions of said attachment means are concealed from view outside of the vehicle body.

2. The window assembly of claim 1 wherein said attachment means include a frame bezel having an edge defining a window aperture; said window being larger than said window aperture and having a side surface facing said frame bezel edge; said peripheral window edge extending beyond said frame bezel edge; said casing extending intermediate said side surface of said window and said frame bezel edge and ending at a location flush with an outside surface of said frame bezel edge.

3. The window assembly of claim 1 wherein said casing is formed from a tough, flexible, resilient material such as polyvinyl chloride.

4. The window assembly of claim 1 wherein said first portion of said attachment means includes at least one projection extending inwardly of said casing in a direction toward the inside of the vehicle body; said casing extending continuously around the entire peripheral edge of said window and encompassing said projection.

5. The vehicular window assembly of claim 4 wherein said projection extends generally perpendicular to the general plane of said window adjacent to said peripheral edge.

6. The window assembly of claim 4 wherein said projection includes irregular surface means for engaging and holding the molded plastic material forming said casing, said casing extending around and filling said irregular surface means.

7. The window assembly of claim 6 wherein said irregular surface means include means defining an aperture extending through said projection.

8. The window assembly of claim 4 wherein said casing is formed from polyvinyl chloride.

9. The window assembly of claim 1 wherein said attachment means includes a plurality of said first portions, each of said first portions including a projection extending into and encompassed by said casing.

10. The window assembly of claim 1 including an adhesion promoting primer layer intermediate said casing and said window; said transparent window being a sheet of glass.

11. The window assembly of claim 1 wherein said attachment means includes a frame bezel extending along said casing; sealing means extending between said frame and said casing for sealing the joint between said frame and casing.

12. The window assembly of claim 1 including sealing means for extending between said composite casing and window and a portion of a vehicle body forming a support for said window unit, said sealing means extending around the entire interior of said composite casing and window.

13. The window assembly of claim 1 wherein said second affixing portions of said attachment means include a plurality of studs extending in a direction toward the inside of the vehicle body from the inside of said assembly for receiving securing nuts thereon.

14. The window assembly of claim 1 wherein said attachment means includes a frame bezel formed from metal finished as desired and having inner and outer surfaces, said window and casing being located on the inner side of said frame bezel with at least a portion of said casing lying flush with an outer surface of said frame bezel whereby said window assembly is ready to use and may be applied to a vehicle body with said second, affixing portions, the inner side of said frame bezel facing said vehicle body, the second, affixing portions concealed from view, and the outer side of said frame bezel exposed.

15. A vehicular window assembly formed as a complete unit prior to installation and adapted for installation from the exterior of a vehicle body to provide an assembly for closing an opening in a vehicle body, said window assembly comprising a finished window frame bezel having interior and exterior surfaces and a window aperture therein; a transparent window positioned adjacent said window aperture of said frame bezel and having a peripheral edge; projection means on the interior surface of said frame bezel adjacent said peripheral edge of said window; resilient, flexible, gasket means molded around the peripheral edge of said window and around the said projection means for securing said window to said frame bezel to form an integral composite finished assembly for attachment to a vehicle body; said composite assembly having a finished exterior surface requiring no finishing or modification after said assembly is attached to a vehicle body; said frame bezel, when said projection means is molded within said gasket means, having portions of sufficient size, shape and position for attachment of said frame bezel to said vehicle; and means for attaching said portions to said vehicle.

16. The window assembly of claim 15 wherein said frame bezel and window are correspondingly curved; said gasket means being formed from a tough, resilient, flexible material; said material of said gasket means and said projection means holding said window to said frame bezel while accommodating any difference in curvature or contour therebetween.

17. The vehicular window assembly of claim 15 wherein said frame bezel includes an edge defining said window aperture; said window being larger than said window aperture and having a side surface facing said frame bezel edge; said peripheral window edge extending beyond said frame bezel edge; said gasket means extending intermediate said side surface of said window and said frame bezel edge and ending at a location flush with an outside surface of said frame bezel edge.

18. The vehicular window assembly of claim 15 including an adhesion promoting primer layer intermediate said gasket means and said window; said transparent window being a sheet of glass.

19. The vehicular window assembly of claim 18 including sealing means extending between said frame bezel and said gasket means for sealing the joint between said frame bezel and gasket means.

20. The window assembly of claim 15 wherein said projection means include at least one projection on said interior surface of said frame bezel extending inwardly of said assembly; said gasket means extending continuously around the entire peripheral edge of said window and encompassing said projection to retain said window and gasket means to said frame bezel.

21. The window assembly of claim 20 wherein said projection includes irregular surface means for engaging and holding the material forming said gasket means, said gasket means extending around and filling said irregular surface means.

22. The vehicular window assembly of claim 15 in combination with a vehicle body having an opening therein adapted to be closed by said vehicular window assembly; sealing means extending between said inner surface of said frame bezel and a portion of said vehicle body adjacent said opening for sealing between said window assembly and vehicle, said sealing means extending around the entire interior of said assembly; said frame bezel being formed and completely finished prior to inclusion in said window assembly; said window assembly being positioned over said vehicle body opening from the exterior of said vehicle body as a complete unit sealed by said sealing means with only final securement of said assembly with said means for attaching said portions being necessary from the interior of the vehicle body.

23. The vehicular window assembly of claim 15 wherein said means for attaching said portions include means formed in one piece with and projecting from said inner surface of said frame bezel for extending through a portion of a vehicle body to retain said assembly on said body.

24. The vehicular window assembly of claim 15 in which said means for attaching said portions is located interior of said exterior frame bezel surface and provides concealed attachment of said assembly to a vehicle.

* * * * *

UNITED STATES PATENT AND TRADEMARK OFFICE
CERTIFICATE OF CORRECTION

PATENT NO. : 4,072,340
DATED : February 7, 1978
INVENTOR(S) : CLEON C. MORGAN

It is certified that error appears in the above-identified patent and that said Letters Patent are hereby corrected as shown below:

Column 5, Line 3:

After "gasket" please insert --or casing--.

Column 8, Line 2:

After "frame" insert --bezel--.

Column 8, Line 3:

After "frame" please insert --bezel--.

Signed and Sealed this

Fifth Day of December 1978

[SEAL]

Attest:

RUTH C. MASON
Attesting Officer

DONALD W. BANNER
Commissioner of Patents and Trademarks